US010240503B2

(12) United States Patent
Hodgson et al.

(10) Patent No.: US 10,240,503 B2
(45) Date of Patent: Mar. 26, 2019

(54) ORBITAL PUMP WITH REINFORCING RING

(71) Applicant: Continental Automotive GmbH, Hannover (DE)

(72) Inventors: Jan Hodgson, Troisdorf (DE); Yves Kopp, Remering-les-Puttelange (FR); Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 161 days.

(21) Appl. No.: 15/506,155

(22) PCT Filed: Aug. 27, 2015

(86) PCT No.: PCT/EP2015/069617
§ 371 (c)(1),
(2) Date: Feb. 23, 2017

(87) PCT Pub. No.: WO2016/030451
PCT Pub. Date: Mar. 3, 2016

(65) Prior Publication Data
US 2017/0292428 A1    Oct. 12, 2017

(30) Foreign Application Priority Data
Aug. 28, 2014 (DE) .......................... 10 2014 112 391

(51) Int. Cl.
*F01C 5/00*    (2006.01)
*F03C 2/00*    (2006.01)
(Continued)

(52) U.S. Cl.
CPC ............ *F01N 3/2066* (2013.01); *F04B 53/16* (2013.01); *F04C 5/00* (2013.01);
(Continued)

(58) Field of Classification Search
CPC .. F01N 3/2066; F01N 2610/1433; F04C 5/00;
F04C 2210/1083; Y02A 50/2325; Y02T 10/24; F04B 53/16; F05C 2251/046
(Continued)

(56) References Cited

U.S. PATENT DOCUMENTS 664,507 A * 12/1900 Singer ................. F04B 43/1238
417/476
2,460,617 A * 2/1949 Balogh ...................... F04C 5/00
418/56
(Continued)

FOREIGN PATENT DOCUMENTS

| CN | 2199336 Y | 5/1995 |
| CN | 1113546 | 12/1995 |

(Continued)

*Primary Examiner* — Theresa Trieu
(74) *Attorney, Agent, or Firm* — Cozen O'Connor

(57) ABSTRACT

A pump for delivering a fluid includes: a pump housing having an inlet and an outlet, and having an inner circumferential face; a drive shaft; an eccentric inside the pump housing, the eccentric being eccentrically movable relative to the pump housing; a deformable element arranged in a pump gap between the inner circumferential face and an outer surface of the eccentric, the deformable element and the inner circumferential face defining a delivery channel. The deformable element is forced against the pump housing by the outer surface of the eccentric along at least a portion of the delivery channel such to form a sliding sealing of the delivery channel that can be slid along the delivery channel from the inlet to the outlet to deliver fluid by movement of the eccentric. A reinforcing ring has a coefficient of thermal expansion smaller than a coefficient of thermal expansion of the pump housing.

12 Claims, 5 Drawing Sheets

(51) Int. Cl.
*F03C 4/00* (2006.01)
*F04C 18/00* (2006.01)
*F04C 2/00* (2006.01)
*F01N 3/20* (2006.01)
*F04C 5/00* (2006.01)
*F04B 53/16* (2006.01)

(52) U.S. Cl.
CPC .............. *F01N 2610/1433* (2013.01); *F04C 2210/1083* (2013.01); *F05C 2251/046* (2013.01); *Y02A 50/2325* (2018.01); *Y02T 10/24* (2013.01)

(58) Field of Classification Search
USPC ............. 418/45, 56, 66, 129, 153, 215
See application file for complete search history.

(56) References Cited

U.S. PATENT DOCUMENTS

| | | | |
|---|---|---|---|
| 2,544,628 A | 3/1951 | Copping | |
| 2,885,966 A * | 5/1959 | Ford | F04B 43/14 417/477.7 |
| 2,946,291 A * | 7/1960 | Roebig | F04C 5/00 418/56 |
| 3,408,947 A | 11/1968 | McMillan | |
| 4,332,534 A * | 6/1982 | Becker | F04C 5/00 418/45 |
| 5,006,049 A | 4/1991 | Von Der Heyde et al. | |
| 5,988,998 A * | 11/1999 | Glover | F04C 5/00 418/153 |
| 7,374,411 B2 | 5/2008 | Nakakuki et al. | |
| 9,453,507 B2 | 9/2016 | Ghodsi-Kameneh et al. | |
| 2013/0232957 A1* | 9/2013 | Brueck | F01N 3/2066 60/295 |
| 2013/0323083 A1* | 12/2013 | Maguin | F01N 3/2066 417/32 |
| 2015/0377106 A1 | 12/2015 | Brück et al. | |

FOREIGN PATENT DOCUMENTS

| | | |
|---|---|---|
| DE | 28 53 916 A1 | 6/1980 |
| DE | 38 15 252 A1 | 11/1989 |
| DE | 10 2005 033 679 A1 | 2/2006 |
| DE | 10 2011 015 110 B3 | 1/2012 |
| DE | 10 2013 101412 | 8/2014 |
| EP | 0 819 853 A2 | 1/1998 |
| JP | S 61-118581 | 6/1986 |

* cited by examiner

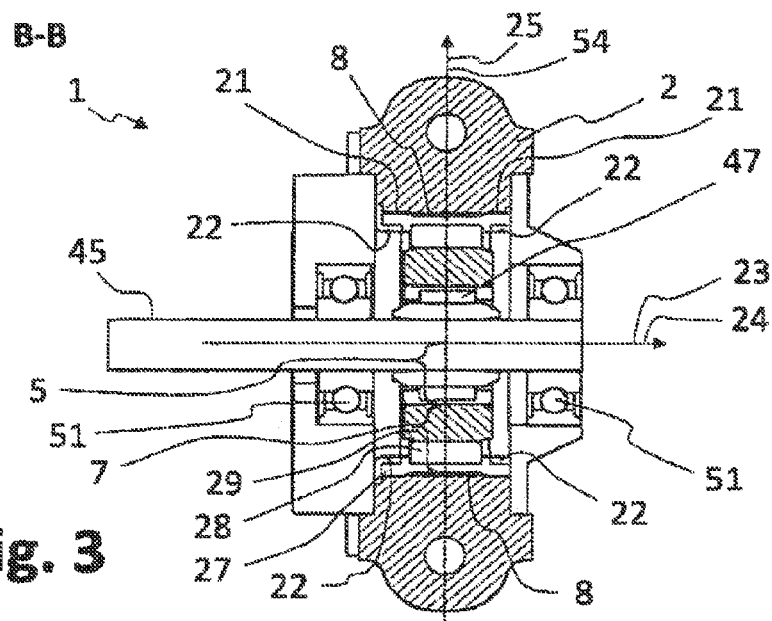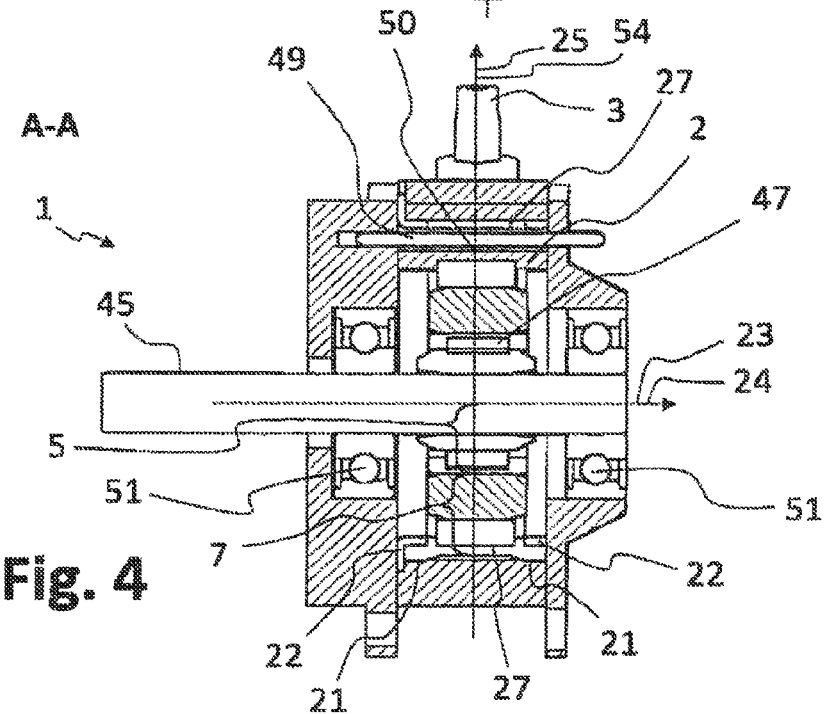

ORBITAL PUMP WITH REINFORCING RING

CROSS-REFERENCE TO RELATED APPLICATIONS

This is a U.S. national stage of application No. PCT/EP2015/069617, filed on 27 Aug. 2015, which claims priority to the German Application No. 10 2014 112 391.3 filed 28 Aug. 2014, the content of both incorporated herein by reference.

BACKGROUND OF THE INVENTION

1. Field of the Invention

The invention relates to a pump for delivering a liquid, the pump being suitable in particular for delivering a liquid exhaust-gas purification additive (such as, for example, urea-water solution) into an exhaust-gas treatment device for the purification of the exhaust gases of internal combustion engines.

2. Related Art

Exhaust-gas treatment devices in which use is made of a liquid additive for exhaust-gas purification are widely used, for example, in the automotive field. A liquid additive is used in exhaust-gas treatment devices in particular for removing nitrogen oxide compounds from the exhaust gas. The so-called SCR method (SCR=Selective Catalytic Reduction) is used in exhaust-gas treatment devices of this type. In the SCR method, nitrogen oxide compounds in the exhaust gas are reduced with the aid of a reducing agent (normally ammonia). Ammonia is often normally stored in the motor vehicle not in pure form but rather in the form of a liquid (exhaust-gas) additive, which is converted into ammonia outside the exhaust gas (in an external reactor provided for the purpose) and/or within the exhaust gas (in the exhaust-gas treatment device). In this context, urea-water solution is preferably used as liquid additive. A urea-water solution with a urea content of 32.5% is available under the trade name AdBlue®.

In the motor vehicle, the liquid additive is commonly stored in a tank and introduced into the exhaust-gas treatment device by a delivery unit. A delivery unit normally also has at least one pump. Furthermore, a delivery unit may also have, inter alia, the following components: filter, sensor, valve and/or dosing unit.

A problem with a delivery unit for liquid additive is that the additive can freeze at low temperatures. A 32.5% urea-water solution, for example, freezes at −11° C. In motor vehicles, such low temperatures may arise in particular during long standstill phases in winter. When the additive freezes, an increase in volume occurs that can damage or even destroy the lines, ducts and/or components of the delivery module. The freezing process is a problem in particular for a pump, because a pump is in intensive contact with the liquid additive. Destruction of the pump may, for example, be prevented by virtue of the delivery unit being evacuated upon deactivation, such that no liquid additive remains in the delivery module during a standstill phase. Another approach for protecting the pump is to provide measures in the pump for protection against freezing. For example, the pump or the components thereof may be designed to be so flexible that no damage is caused as a result of the volume expansion of the liquid additive during the freezing process.

In particular within the pump, it is technically very cumbersome to ensure measures for protection against freezing, because the pump must be in intensive contact with the liquid additive in order to be able to deliver the liquid additive.

Furthermore, a complete evacuation of the pump is often problematic because a resumption of delivery after a stoppage of operation is made considerably more difficult as a result.

A pump for delivering liquid additive should also be as inexpensive as possible and exhibit high durability. This includes in particular high reliability and/or low failure probability and resistance to ageing. Here, the expression "ageing" refers in particular to a deterioration of the pump with regard to dosing accuracy and delivery rate owing to wear.

Furthermore, in the case of the pump, the capability of providing an exact delivery flow rate may also be of importance. The capability of providing an exact delivery flow rate, or the analogous expression "dosing accuracy", is meant here in particular to mean that the liquid flow rate actually delivered by the pump can be predefined precisely by clearly determinable input variables, wherein here, the expression "input variable" describes in particular the electric actuation of the drive of the pump (voltage profile and/or current profile for driving the pump, frequency of current sequences for driving the pump, etc.). In particular, it is important that the number and/or relevance of cross-influences that influence the dependency of the delivery flow rate on the input variables is kept low. Such cross-influences may, for example, be the temperature of the pump, the pressure in the pump, etc. If significant cross-influences are unavoidable, it should be possible for the effect of the cross-influences on the delivery flow rate to be calculated and/or monitored as accurately as possible. The dosing accuracy of a pump can be described, for example, by a statistical deviation between an expected, desired delivery flow rate and an actually delivered delivery flow rate. A pump has, for example, a high dosing accuracy if the deviation is, on average, less than 10%. A dosing accuracy can (for urea-water solution delivery flow rates in the case of the SCR method) be considered to be low for example if the deviation is on average greater than 20%. These percentage values should, in each case, be understood merely as examples.

Documents U.S. Pat. No. 2,544,628, U.S. Pat. No. 3,408,947, DE 285 39 16 A1 and DE 381 52 52 A1 disclose a pump type also referred to as an orbital pump. This pump type is, on the one hand, relatively durable with regard to a volume expansion of a liquid in the event of freezing, and furthermore this pump type can also be operated with a reversed delivery direction, such that an evacuation of a delivery unit is possible in a simple manner by a pump of this type. There is a requirement for this pump type to be adapted to the demands in the field of the SCR method, in particular with regard to the dosing accuracy and/or ageing behavior and resistance to urea-water solution and ice pressure.

SUMMARY OF THE INVENTION

Taking this as a starting point, it is an object of the present invention to propose a particularly advantageous pump for the delivery of a liquid, which pump at least partially solves the above problems and is in particular suitable for the delivery of liquid additives for exhaust-gas purification (such as urea-water solution).

This object maybe achieved by a pump for delivering a liquid, having at least one pump housing with at least one inlet and at least one outlet, having an inner circumferential face and having a geometric axis, wherein an eccentric is arranged within the pump housing and the eccentric is movable in eccentric fashion relative to the pump housing about the geometric axis, wherein a deformable element is arranged in a pump gap between the inner circumferential face of the pump housing and an outer face of the eccentric, and wherein a delivery duct is formed from the at least one inlet to the at least one outlet by the deformable element and by the inner circumferential face of the pump housing, and wherein furthermore, the deformable element is pressed against the pump housing along at least one section of the delivery duct by the outer face of the eccentric such that at least one displaceable seal of the delivery duct and at least one closed pump volume are formed in the delivery duct, these being displaceable along the delivery duct from the inlet to the outlet by a movement of the eccentric for the delivery of the liquid, wherein the pump has a stiffening ring on the deformable element, and wherein a first coefficient of thermal expansion of the stiffening ring is lower than a third coefficient of thermal expansion of the pump housing.

A pump with this construction can also be referred to as an orbital pump.

In one aspect, the pump has a (central) geometric axis about which the eccentric can be rotated. For this purpose, it is preferable for a drive shaft to extend along the drive axis, which drive shaft connects the eccentric to an (electrically operable) drive. The drive is preferably arranged along the axis, above and/or below the pump housing. For the description of the pump and of its components in spatial terms, a radial direction is hereinafter assumed that is perpendicular to the geometric axis of the pump and that extends outward in a radial direction proceeding from the geometric axis of the pump. A circumferential direction should likewise be defined as being perpendicular to the geometric axis and perpendicular to the radial direction and tangential to the inner circumferential face of the pump housing. The delivery duct extends at least in sections along the circumferential direction through the pump housing, or along the inner circumferential face of the pump housing, from the inlet to the outlet of the pump. For the further description of the pump, a central plane of the pump is also defined. The central plane is arranged perpendicular to the geometric axis. The pump housing, the eccentric, the deformable element and the delivery duct lie in the central plane.

The pump housing of the pump is preferably constructed in the manner of a ring or a cylindrical chamber, inside which (inside the ring or in the cylindrical chamber) the eccentric is arranged. The pump housing may also be regarded as an (external) stator of the pump, wherein the eccentric is referred to as an (internal) rotor. For a kinematic reversal, the invention is also intended to encompass constructions in which the pump housing with inlet and outlet is situated internally and the eccentric runs around the outside, wherein the pump gap is situated between the outer circumferential face of the internally situated pump housing and an inner face of the eccentric. In this embodiment of the pump, it is possible for the pump housing to form an internal stator surrounded by the eccentric. The eccentric then forms an external rotor. The inlet and the outlet are arranged on the pump housing and permit the inflow and outflow of the liquid into the pump housing and into the delivery duct.

The pump housing is preferably composed of plastic. Stiffening structures may be integrated in the pump housing.

In a preferred design variant, in a pump housing composed of plastic, there is integrated an annular metallic insert that stiffens the pump housing.

In this case, the expression "eccentric" means in particular a circular structure arranged eccentrically with respect to the geometric axis and which performs an eccentric movement when it rotates about the geometric axis. An annular or encircling pump gap is formed between the pump housing and the eccentric, in which gap the deformable element is arranged. The delivery duct is arranged (within the gap) between the deformable element and the pump housing and is delimited by the pump housing and the deformable element. The pump gap has at least one constriction displaced along the pump housing or along the delivery duct by a rotation of the eccentric. At the constriction, the deformable element is pressed against the housing, such that the displaceable seal is formed there. Between the pump housing and the deformable element, the delivery duct has a duct cross section through which liquid can flow, which duct cross section may for example (depending on the size of the pump) amount to between 1 mm$^2$ [square millimeters] and 50 mm$^2$ at the largest point.

The delivery duct is preferably formed annularly, or in an encircling manner, around the axis. The inlet and the outlet are preferably arranged with an angular spacing of greater than 270° with respect to one another (measured in the central plane) in a delivery direction of the pump. Counter to the delivery direction, the inlet and the outlet thus have an angular spacing of less than 90° with respect to one another.

The eccentric is preferably of multi-part form. The eccentric preferably has an inner eccentric region which performs an eccentric rotational movement. Furthermore, an outer bearing ring may be provided that surrounds the inner region. It is preferable for at least one bearing to be situated between the inner region and the outer bearing ring. The bearing may be a ball bearing or a roller bearing. The inner eccentric region of the eccentric performs a rotational movement about the axis during operation. The eccentric arrangement gives rise to an eccentric movement. The eccentric movement is transmitted to the outer bearing ring. By a bearing between the inner eccentric region and a bearing ring, an eccentric rotational movement of the inner eccentric region can be converted into an eccentric wobbling movement of the bearing ring without the rotational movement component of the movement of the inner region also being transmitted. The fact that the movement of the bearing ring does not have a rotational movement component makes it possible for shear stresses in the deformable element and internal friction forces in the pump to be reduced. The deformable element is flexed owing to the movement of the eccentric. It is preferable for only pressure forces and substantially no friction forces to act at a contact surface of the eccentric and of the deformable element. A corresponding division of the eccentric into an inner eccentric region and an outer bearing ring is also possible if the eccentric is an external rotor arranged around an (inner) pump housing. It is also possible for the outer bearing ring to be dispensed with and for the rollers of the bearing to roll directly on or against the deformable element.

As already described further above, the deformable element is, to form the displaceable seal, pressed in regions or in sections against the inner circumferential face of the pump housing. At the seal, there is (linear or areal) contact between the deformable element and the inner circumferential face of the pump housing, which has the effect that the liquid cannot flow through. In other words, the deformable element bears fully against the pump housing, such that the duct cross section has no cross-sectional area in the region of the displaceable seal. The delivery duct is accordingly interrupted in the region of the displaceable seal. It is thus also the case that at least one closed pump volume is formed within the delivery duct. The reference to a closed pump volume means that there is a section of the delivery duct that is closed off at least on one side (upstream or downstream along the delivery duct). By a displacement of the displaceable seal, the at least one closed pump volume is also displaced, such that the liquid situated in the closed pump volume is delivered. It is preferable if, during the operation of the pump, multiple closed pump volumes are displaced from the inlet of the pump to the outlet of the pump in order to deliver the liquid. In this way, a closed pump volume is created (meaning closed off at least on one side) in the vicinity of the inlet and is then eliminated (meaning opened again at least on one side) at the outlet. At the inlet, a closed pump volume is closed off by a displaceable seal only on one side, in a downstream direction, and is connected in an upstream direction to the inlet, such that the liquid can flow through the inlet into the closed pump volume. At the outlet, the closed pump volume is (still) closed off by a seal (only) on one side, this however being in an upstream direction, and the closed pump volume is connected in a downstream direction to the outlet, such that the liquid can flow through the outlet out of the closed pump volume. In between (on the path of the closed pump volume from the inlet to the outlet), there is a phase in which the closed pump volume is closed off by the at least one displaceable seal in the upstream and downstream directions.

The deformable element may also be referred to as a deformable diaphragm. Here, the expression "diaphragm" does not imperatively specify whether the deformable element has an areal extent. The expression "diaphragm" should be understood as an indication that the deformable element is a flexible structure that can be deformed for the delivery of liquid. As material for the deformable element or the deformable diaphragm, use is preferably made of an elastomer material (for example natural rubber or latex). To increase the durability and/or to establish and maintain the flexibility, the material of the deformable element may include additives. The deformable element is preferably flexible in all directions (in the axial direction, in the radial direction and in the circumferential direction). It is however also possible for the deformable element to exhibit partially directional flexibility. The deformable element may for example exhibit greater flexibility in the radial direction than in the circumferential direction and in the axial direction. A deformation of the deformable element in one direction typically also causes a deformation in other directions. The deformable element expands, for example, in the axial direction and/or in the circumferential direction when compressed in the radial direction.

On the pump, there is preferably also provided a static seal that prevents an undesired backflow of the liquid from the outlet to the inlet (counter to the delivery direction). The static seal may be provided so as to be positionally fixed by the pump housing. The static seal is normally positioned between the outlet and the inlet. The deformable element may, in the region of the static seal, be clamped or adhesively bonded to the pump housing so as to permanently ensure a fluid-tight seal between the pump housing and the deformable element. The static seal exhibits fluid-tight properties regardless of the position of the eccentric, and is not displaceable.

A delivery of liquid in the delivery direction from the inlet to the outlet is preferably possible by the pump. If appropriate, a reversal of the delivery direction (from the outlet back to the inlet rather than from the inlet to the outlet) is also possible by a reversal of the direction of rotation of the eccentric.

The stiffening ring is embedded into the deformable element and/or bears directly against an inner circumferential face of the deformable element.

The coefficient of thermal expansion describes the thermal expansion owing to temperature increases, and is normally expressed in the units of μm/mK [micrometer/meter*kelvin]. In the case of a coefficient of thermal expansion of 20 μm/mK, for example, this means that a component that has a length of 1 m at a reference temperature expands to a length of 1.002 m if the temperature is 100 kelvin above the reference temperature and contracts to a length of 0.998 m if the temperature is 100 kelvin below the reference temperature. The actual expansion behavior is often non-linear. The specifications for coefficients of thermal expansion are thus generally linear approximation values for the expansion behavior of a component in the immediate vicinity of a reference temperature. For the following explanations, a first coefficient of thermal expansion is defined for the stiffening ring, a second coefficient of thermal expansion is defined for the deformable element, or for a sealing element of the deformable element, and a third coefficient of thermal expansion is defined for the pump housing.

By virtue of the fact that the first coefficient of thermal expansion of the stiffening ring is lower than a third coefficient of thermal expansion of the pump housing, a gap between the stiffening ring and the pump housing becomes larger in the presence of elevated temperatures. In this way, it is possible to compensate for a temperature-dependent expansion of the deformable element in the pump gap. This makes it possible for the dosing accuracy of the pump in the presence of varying temperatures to be increased.

The pump is preferable if the (first) coefficient of thermal expansion of the stiffening ring amounts to less than 66% of the (third) coefficient of thermal expansion of the pump housing, in particular to between 20% and 50% of the coefficient of thermal expansion of the pump housing.

It has been found that such a low coefficient of thermal expansion of the stiffening ring is suitable for compensating a thermal expansion of the deformable element. In this context, it must be taken into consideration that the thermal expansion or the coefficient of thermal expansion of the deformable element is generally higher than the coefficient of thermal expansion of a pump housing. One cause for this is the fact that flexible materials are used for the deformable element. Such materials normally have higher coefficients of thermal expansion than solid materials that are used for the housing. (Second) coefficients of thermal expansion of materials of the deformable element are normally higher than 100 μm/mK. Coefficients of thermal expansion of materials for the pump housing are normally less than 50 μm/mK.

The pump is particularly preferable if the pump housing is composed of a plastic material and the stiffening ring is composed of a metallic material.

As has already been stated further above, the lower coefficient of thermal expansion of the stiffening ring in relation to the pump housing has the effect of compensating for the high coefficient of thermal expansion of the deformable element or of the sealing element. Metallic materials normally have lower coefficients of thermal expansion than plastic materials. It is therefore advantageous for the stiffening ring to be formed from a metallic material. At the same time, it is advantageous for the pump housing to be formed from a plastic material. This reduces the costs for the manufacture of the pump housing. The stiffening ring may, for example, be produced from steel. The stiffening ring preferably has a (first) coefficient of thermal expansion of less than 30 μm/mK.

The pump is furthermore advantageous if the stiffening ring is integrated into the deformable element, and wherein the deformable element has, on the outside of the stiffening ring, an annular flexible sealing element, and, on the inside of the stiffening ring, an annular elastic compensation element.

The flexible sealing element and the stiffening ring then form sections of the deformable element that are separated from the stiffening ring at least in regions. The annular flexible sealing element serves, together with the pump housing, to form the delivery path from the inlet to the outlet. The annular elastic compensation element permits a flexible connection of the deformable element to the eccentric. In particular, there is no direct contact between the stiffening ring and the eccentric, such that the stiffening ring and the eccentric can move relative to one another. The elastic compensation element serves for transmitting forces from the eccentric to the stiffening ring and to the flexible sealing element. It is, for example, also possible for manufacturing tolerances or pressure fluctuations within the pump to be compensated in this way.

Furthermore, a deformable element composed of stiffening ring, flexible sealing element and elastic compensation element forms a component which combines within it all of the characteristics crucial to the dosing accuracy of a pump, and which can for example also be exchanged, as an exchangeable component, during maintenance of the pump.

The annular flexible sealing element and the annular elastic compensation element are preferably molded or cast onto the stiffening ring of the deformable element. In a further design variant, the stiffening ring is cast into the deformable element and divides the deformable element into sealing element and flexible compensation element. It is furthermore possible for the stiffening ring to be entirely surrounded by the material of the flexible sealing element and of the elastic compensation element.

In particular, the elastic compensation element also generates thermal expansion compensation between the stiffening ring and the eccentric. In particular if the eccentric has a higher coefficient of thermal expansion than the stiffening ring, a gap between the stiffening ring and the eccentric becomes smaller if the pump is subjected to higher temperatures. The elastic compensation element then permits substantially free thermal expansion of the stiffening ring. In particular, no force is generated that expands the stiffening ring from the inside and thus decreases the size of a gap between the stiffening ring and pump housing again.

Further above, the material of the deformable element has been described as being a natural rubber material or natural rubber-like material which has, for example, a coefficient of thermal expansion of greater than 100 μm/mK. This material specification always relates only to the deformable element without integrated stiffening ring. If a stiffening ring is integrated into the deformable element, the combination of stiffening ring and further sections of the deformable element generally has a considerably lower coefficient of thermal expansion, because the stiffening ring prevents thermal expansion of the deformable element.

In a further design variant, the deformable element forms a deformable sealing element, against the inside of which the stiffening ring bears, wherein an elastic compensation element is arranged between the stiffening ring and the eccentric.

Here, an alternative design variant is described in which the sealing element, stiffening ring and compensation element do not form an integral component. It is, however, nevertheless possible for the stiffening ring to be connected to the compensation element and/or for the stiffening ring to be connected to the sealing element.

The pump is furthermore advantageous if the sealing element has a first modulus of elasticity and the compensation element has a second modulus of elasticity, wherein the second modulus of elasticity is at least twice the first modulus of elasticity.

The modulus of elasticity describes the stiffness of a material and is expressed in the units of $kN/mm^2$ [kilonewtons per square millimeter]. A component with a high modulus of elasticity or with high stiffness can also be referred to as being "firm", "stiff" or "rigid". A component with a low modulus of elasticity or with low stiffness is also referred to as being "flexible" or "elastic". The property of a component of having a low modulus of elasticity or low stiffness is also referred to as "elasticity". The sealing element preferably has a first modulus of elasticity of between $0.005\ kN/mm^2$ and $0.2\ kN/mm^2$. The elastic compensation element preferably has a second modulus of elasticity of from $0.1\ kN/mm^2$ to $5\ kN/mm^2$. The second modulus of elasticity of the elastic compensation element is thus duly considerably greater than the first modulus of elasticity of the sealing element, but nevertheless, the second modulus of elasticity is still relatively low in absolute terms, such that the compensation element can be referred to as being "elastic".

The elasticity of the elastic compensation element has the effect in particular that manufacturing tolerances of the pump are compensated. The greater the accuracy with which the pump is manufactured, the greater the second modulus of elasticity can be. By a high second modulus of elasticity, the internal friction within the elastic compensation element is reduced, because a high modulus of elasticity reduces the deformations occurring in the elastic compensation element. It is therefore advantageous to provide a relatively stiff compensation element that has a relatively high second modulus of elasticity (which is higher than a first modulus of elasticity of the sealing element). This firstly makes the pump tolerant with respect to manufacturing inaccuracies, and secondly, the internal friction during the operation of the pump is significantly lower than if use is made of a compensation element with a lower modulus of elasticity.

The pump is furthermore advantageous if the stiffening ring has a third modulus of elasticity at least twice a second modulus of elasticity of a compensation element between the stiffening ring and the eccentric.

As already described further above, the second modulus of elasticity of the compensation element preferably lies in the range from $0.1\ kN/mm^2$ to $5\ kN/mm^2$. The third modulus of elasticity is preferably greater than $50\ kN/mm^2$, preferably even greater than $100\ kN/mm^2$ and very particularly preferably even greater than $200\ kN/mm^2$. High moduli of elasticity can be realized, for example through the use of metallic materials (in particular steel) for the stiffening ring.

The second modulus of elasticity of the elastic compensation element, which is considerably lower than the third modulus of elasticity of the stiffening ring, makes it possible for the stiffening ring to be decoupled from the eccentric in terms of thermal expansion behavior. The stiffening ring itself has a low coefficient of thermal expansion and therefore itself exhibits only little thermal expansion. The components arranged within the stiffening ring (elastic compensation element, eccentric etc.) could however expand the stiffening ring from the inside if the components themselves exhibited high thermal expansion. To prevent this, an elastic compensation element with a low (third) modulus of elasticity is advantageous, because thermal expansions of the compensation element and of the eccentric then generate only relatively low forces, which act on the stiffening ring from the inside. It is thus possible with the stiffening ring for the expansion behavior of all of the (internal) components of the pump (in particular of the eccentric) to be controlled in an effective manner.

The pump is furthermore advantageous if the pump is designed such that a compression of the deformable element in the region of the displaceable seal corresponds to at most 5% of an element thickness of the deformable element.

Here, the element thickness describes the thickness of the deformable element in the radial direction in the non-deformed state. The compression of the deformable element describes a deformation of the deformable element in the radial direction. In the event of a compression of 5%, the thickness of the deformable element is reduced to 95% of the element thickness (in the non-deformed state).

The compression in the region of the deformable element is related to mechanical forces that act on the displaceable seal at the area of contact between the deformable element and the inner circumferential face of the pump housing. The mechanical forces give rise to the sealing action at the displaceable seal between the individual pump volumes in the delivery path. The stiffer the deformable element is, the smaller is the deformation required in the region of the displaceable seal to ensure mechanical forces sufficient for the sealing action. At the same time, with reduced sealing element compression, the internal friction during the operation of the pump is also reduced. It has been found to be particularly advantageous for the pump to be configured so as to realize a maximum sealing element compression of 5% or of less than 5%. Then, on the one hand, an adequate seal is provided, but on the other hand, the internal friction during the operation of the pump is low, and the pump operates efficiently.

The pump is furthermore advantageous if the displaceable seal bears against the inner circumferential face of the pump housing over a sealing angle about the geometric axis, wherein the sealing angle amounts to at least 90°.

The sealing angle describes the extent of the seal in the circumferential direction. In the region of the sealing angle, the deformable element bears against the inner circumferential face of the pump housing.

Such a large sealing angle permits in particular a situation in which, during the operation of the pump, during every rotation of the eccentric, at least intermittently both the inlet and also the outlet of the pump are closed by the displaceable seal. This prevents in particular an undesired backflow of liquid from the outlet back to the inlet, and furthermore permits particularly uniform delivery of liquid by the pump.

The pump is furthermore advantageous if the stiffening ring has a first coefficient of thermal expansion $\lambda_1$ and a first outer diameter $D_1$, the deformable element has a second coefficient of thermal expansion $\lambda_2$ and a second outer diameter $D_2$, and the pump housing has a housing diameter $D_3$ and a third coefficient of thermal expansion $\lambda_3$, wherein the first outer diameter $D_1$ of the stiffening ring is configured in accordance with the following formula:

$$D_1 = \frac{D_3 \times \lambda_3 - D_2 \times \lambda_2}{\lambda_1 - \lambda_2}$$

If this formula is used for the configuration of the diameter of the stiffening ring, complete compensation of the thermal expansion of the deformable element is possible by the stiffening ring, such that a temperature-independent configuration of the pump is ensured. In this connection, it is particularly advantageous for there to be arranged between the eccentric and the stiffening ring an elastic compensation element that has a third modulus of elasticity considerably lower than a second modulus of elasticity of the stiffening ring. A compensation element of this type makes it possible for the stiffening ring to be decoupled from the eccentric in terms of thermal expansion behavior. In particular, a situation is prevented in which the thermal expansion of the eccentric (indirectly) expands the stiffening ring from the inside. In a further variant, a configuration of the coefficient of thermal expansion $\lambda_1$ of the stiffening ring in accordance with the above-specified formula is also possible, which formula can be correspondingly rearranged for this purpose.

The pump is furthermore advantageous if the deformable element is supported, on both sides of the eccentric in the axial direction, on the inner circumferential face of the pump housing by a respective centring ring, and is pressed against the pump housing such that an annular contact seal is formed in each case.

The centering rings are preferably fastened to the deformable element, or even (correspondingly to the stiffening ring) integrated into the deformable element, on both sides of the stiffening ring in the axial direction. The centering rings squeeze the deformable element against the pump housing over the full circumference along the delivery duct and thus form a radial seal of the delivery duct on both sides of the delivery duct. The diameter of the centering rings is preferably slightly larger than the diameter of the stiffening ring. The centering rings are particularly preferably substantially static relative to the pump housing, such that no relative movements, or only very slight relative movements, occur between the pump housing and the centering rings.

It is also sought here to describe a motor vehicle having an internal combustion engine and having an exhaust-gas treatment device for the purification of the exhaust gases of the internal combustion engine, which exhaust-gas treatment device has an SCR catalytic converter with which the SCR process can be performed, wherein a liquid (in particular a liquid additive for exhaust-gas purification, for example urea-water solution) can be fed to the SCR catalytic converter by a described pump.

BRIEF DESCRIPTION OF THE DRAWINGS

The invention and the technical field will be explained in more detail below on the basis of the figures. It is pointed out that the figures are merely schematic and each show merely preferred exemplary embodiments of the invention. In particular, the proportions illustrated in the figures should be understood merely as being schematic. In the drawings:

FIG. 3: shows a further section through a described pump along the section direction B-B illustrated in FIG. 2;
FIG. 4: shows a further section through a described pump along the section direction A-A illustrated in FIG. 2;

DETAILED DESCRIPTION OF THE PRESENTLY PREFERRED EMBODIMENTS

Figure 1:
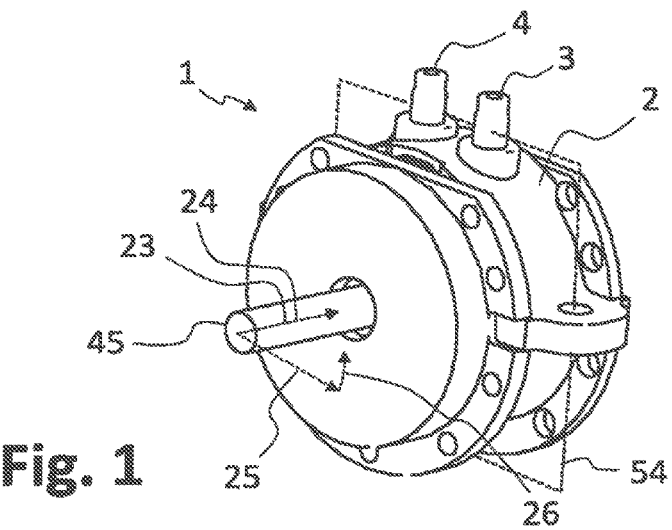
FIG. 1: shows an isometric view of a described pump.

FIG. 1 illustrates the described pump 1 in an isometric view from the outside. The figure shows the pump housing 2 with the inlet 3 and the outlet 4. Also shown is a drive shaft 45 by which the eccentric (not illustrated here) in the pump housing 2 can be driven. An axial direction 24 and a geometric axis 23 of the pump 1 are defined along the drive shaft 45. Furthermore, a radial direction 25 is defined as being perpendicular to the axial direction 24 and the geometric axis 23, and a tangential circumferential direction 26 is defined as being perpendicular to the axial direction 24 and to the geometric axis 23. The coordinate system formed from axial direction 24, radial direction 25 and circumferential direction 26 will hereinafter be used for the spatial description of the pump. FIG. 1 furthermore indicates a central plane 54 of the pump 1.

Figure 2:
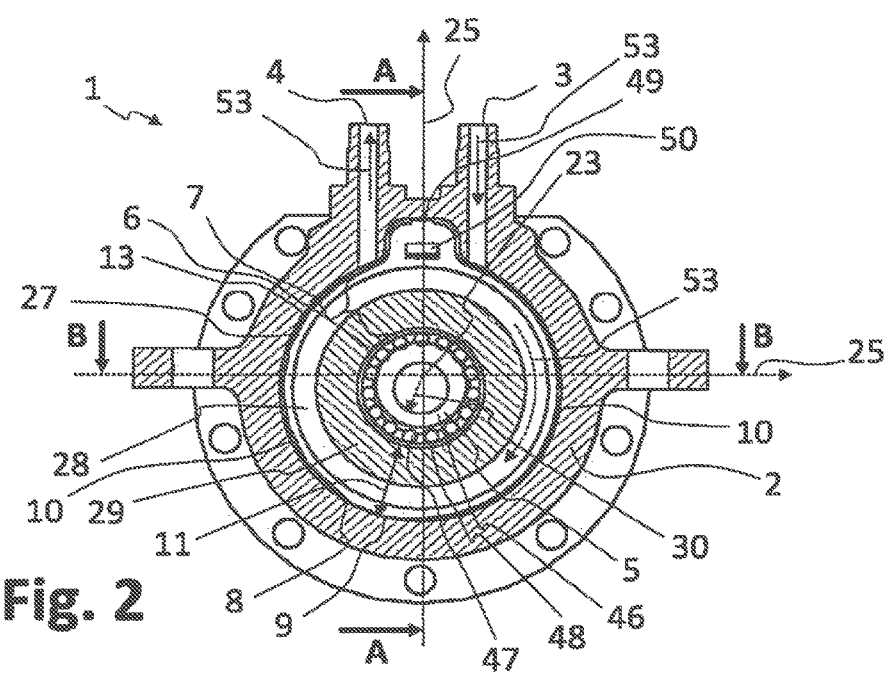
FIG. 2: shows a section through a described pump.

FIG. 2 shows a section through the pump 1 illustrated in FIG. 1, perpendicular to the radial direction 24 from FIG. 1, in the central plane 54 of the pump 1. It can be seen that the central plane 54 intersects the pump housing 2 in the plane in which the inlet 3 and the outlet 4 are also situated. For orientation, the illustration also shows two different radial directions 25 that are perpendicular to one another, wherein the radial directions 25 are oriented on the basis of the inlet 3 and of the outlet 4 of the pump 1. The eccentric 5 is situated in the pump housing 2. The eccentric 5 has an inner eccentric region 46 with an eccentricity 30, an eccentric bearing 47 and an outer ring 48. Between an outer face 6 of the eccentric 5 and an inner circumferential face 13 of the pump housing 2 there is situated a pump gap 11 in which the deformable element 7 is arranged. The deformable element 7 has a stiffening ring 28, a sealing element 27, which bears against the outside of the stiffening ring 28, and an internally situated elastic compensation element 29. Between the deformable element 7 and the pump housing 2, or between the sealing element 27 of the deformable element 7 and the pump housing 2, there is situated a delivery duct 8, which connects the inlet 3 to the outlet 4 and through which the liquid can be delivered along the delivery direction 53 by a movement of the eccentric 5. For this purpose, the deformable element 7 bears against a displaceable seal 9 on the inner circumferential face 13 of the pump housing 2 and divides the delivery duct 8 into displaceable pump volumes 10.

Between the inlet 3 and the outlet 4 there is formed a static seal 49 which, independently of the position of the eccentric 5, ensures fluid-tight contact between the pump housing 2 and the deformable element 7 and thus prevents a backflow of liquid from the outlet 4 to the inlet 3 counter to the delivery direction 53. The static seal 49 is formed by virtue of the deformable element 7 being braced firmly against the pump housing 2 by way of a pin 50 in the region of the static seal 49.

FIG. 3 shows a section through the pump 1 along the section direction B-B illustrated in FIG. 2. For orientation, this figure shows the radial direction 25, the axial direction 24, the central plane 54 and the geometric axis 23 of the pump. The drive shaft 45 of the pump 1 also runs along the axial direction. The figure shows the pump housing 2 with the eccentric 5 arranged therein, the eccentric having the inner eccentric region 46 (see FIG. 5), outer ring 48 (see FIG. 5) and interposed eccentric bearing 47. The figure also shows the sealing element 27, the stiffening ring 28 and the compensation element 29 of the deformable element 7. The drive shaft 45 is mounted, on both sides of the deformable element 7 in the axial direction 24, in a respective shaft bearing 51. In the axial direction 24, the deformable element 7 is furthermore supported at both sides by centering rings 22, which press the deformable element 7 against the pump housing 2 in each case with an annular contact seal 21. Accordingly, the delivery duct 8 is formed between the pump housing 2 and the deformable element 7 or between the pump housing 2 and the sealing element 27 of the deformable element 7, the delivery duct being delimited at both sides (in the axial direction 24) by annular contact seals 21.

FIG. 4 shows a section through the pump 1 along the section direction A-A illustrated in FIG. 2, wherein section substantially corresponds to the section illustrated in FIG. 2. The section direction A-A is however defined such that, in the upper region, the section passes through the static seal 49. The figure shows the deformable element 7, or the sealing element 27 of the deformable element 7, at the static seal, wherein a pin 50 presses the deformable element 7, or the sealing element 27, against the pump housing 2.

Figure 5:
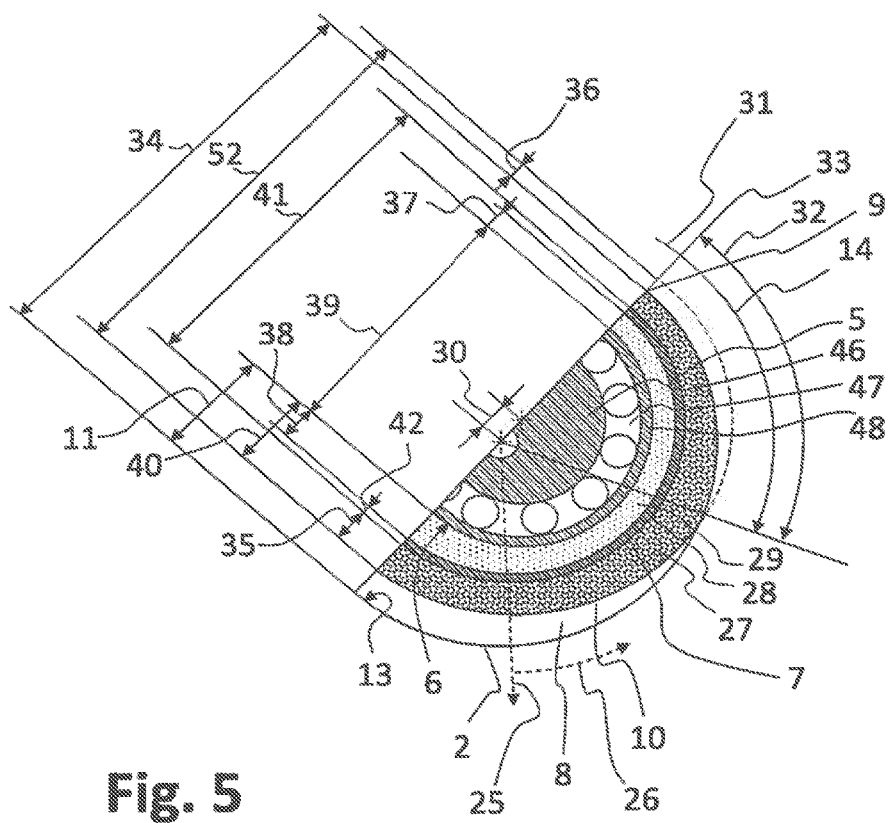
FIG. 5: is a schematic illustration of the deformable element of a described pump together with the eccentric.

FIG. 5 shows a schematic illustration of the deformable element 7 and of the eccentric 5 of the pump. For better understanding of the dimensions of the individual components of the eccentric 5 and of the deformable element 7, half of the pump is illustrated here. For orientation, the radial direction 25 and the circumferential direction 26 are marked in FIG. 5.

The figure shows the deformable element 7 with the stiffening ring 28, the outer sealing element 27 and the inner compensation element 29. The figure also shows the eccentric 5 with the inner eccentric region 46, the eccentric bearing 47 and the outer ring 48, and also the outer face 6. The eccentric 5 has an eccentricity 30. The outer face 6 of the eccentric 5 is furthermore preferably circular and has an eccentric diameter 39. Also schematically illustrated here is the pump housing 2 that has an inner circumferential face 13. Formed between the outer face 6 and the inner circumferential face 13 is the pump gap 11, in which the deformable element 7 and the delivery duct 8 are situated.

The delivery duct 8 is divided, at a displaceable seal 9, into at least one displaceable pump volume 10, wherein the displaceable seal 9 is formed by virtue of the deformable element 7 bearing directly against the inner circumferential face 13 of the pump housing 2. In the upper region of FIG. 5, the section passes centrally through the displaceable seal 9, whereas in the lower region of FIG. 5, the section passes through the displaceable pump volume 10. The displaceable seal 9 extends over a sealing angle 31. In order to adequately illustrate the extent of the displaceable seal 9 in the schematic illustration selected here, the figure shows a sealing position 33, a half sealing angle 32, and the full sealing angle 31. The sealing position 33 defines the exact center (as viewed in the circumferential direction 26) of the displaceable seal 9. From here, the displaceable seal 9 extends in the circumferential direction to both sides in each case over a half sealing angle 32, thus spanning, overall, the sealing angle 31.

The deformable element 7 has an element thickness 40 made up of a ring thickness 42 of the stiffening ring 28, a sealing element thickness 35 of the sealing element 27, and a compensation element thickness 37, 38 of the compensation element 29. Owing to the pressure forces acting on the deformable element 7 at the seal 9, the stiffening ring 28 is displaced relative to the eccentric 5. The relative displacement is manifest in particular in the compensation element, such that a minimum compensation element thickness 37 arises at the seal 9, and a maximum compensation element thickness 38 arises opposite the seal 9. Furthermore, compression 36 of the deformable element 7 occurs at the displaceable seal 9, the compression preferably corresponding to at most 5% of the element thickness 40 of the deformable element.

The stiffening ring 28 has a first outer diameter 41. The deformable element 7 has a second outer diameter 52. The pump housing 2, or the inner circumferential face 13 of the pump housing 2, has a third diameter 34. Through suitable coordination of the coefficients of thermal expansion of pump housing 2, stiffening ring 28 and deformable element 7 or sealing element 27 of the deformable element 7, and through suitable coordination of the respective diameters 34, 52 and 41, it can be achieved that the pump can deliver a predefined flow rate of liquid substantially independently of the prevailing temperature.

Figure 6:
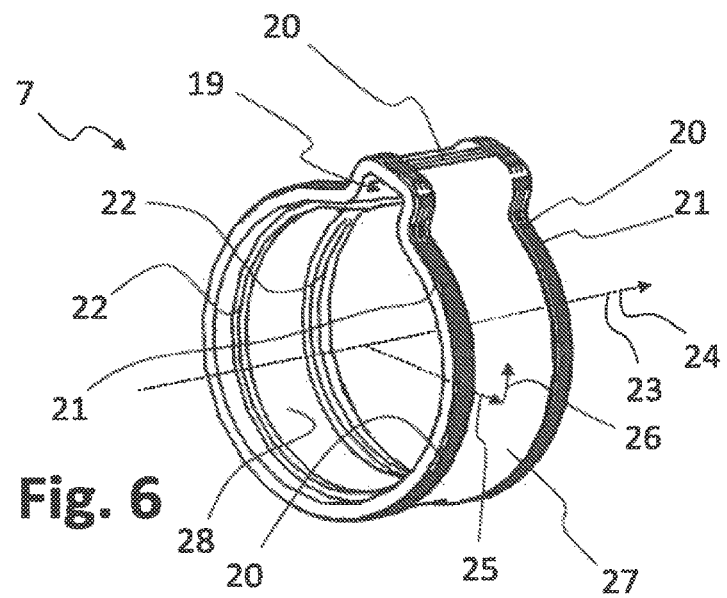
FIG. 6: is an isometric illustration of a deformable element of a described pump.

FIG. 6 shows an isometric view of a deformable element 7 for the described pump. For orientation, the geometric axis 23, the axial direction 24, the radial direction 25 and the circumferential direction 26 are illustrated here. The deformable element 7 has an outer sealing element 27 and a stiffening ring 28. Not illustrated here is a compensation element 29 that may be situated to the inside of the stiffening ring 28. On the sealing element 27 of the deformable element 7 there are formed sealing lips 20 by which the deformable element 7 bears in fluid-tight fashion against the pump housing of the pump, such that annular contact seals 21 are formed between the pump housing and the deformable element 7 in order to delimit the delivery duct. To form the static seal and to receive a pin for forming the static seal, the deformable element 7 has a protuberance 19 into which the pin can be placed in order to form the static seal. On both sides of the stiffening ring 28 in the axial direction 24, centering rings 22 are also formed on the deformable element, by which centering rings the sealing lips 20 of the deformable element 7 can be pressed against the pump housing of the pump in order to form the annular contact seals 21.

Figure 7:
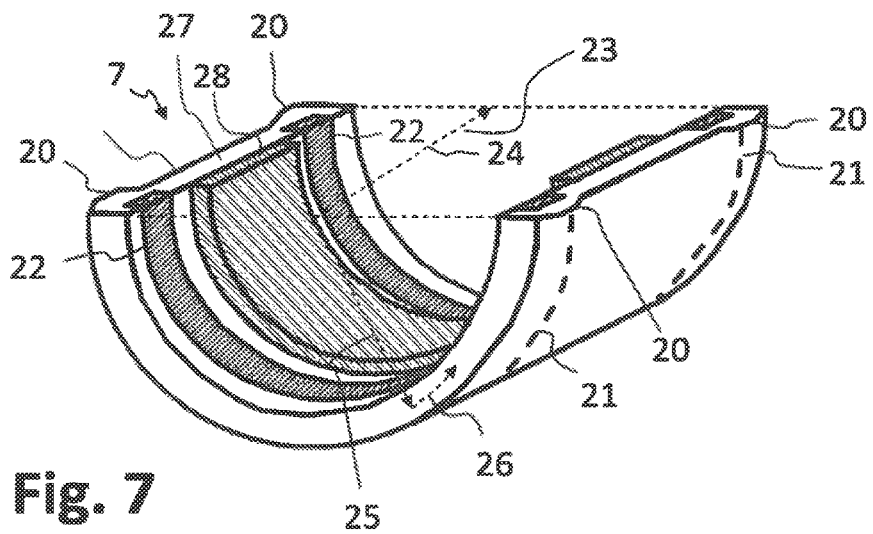
FIG. 7: is an isometric sectional illustration through the deformable element from FIG. 6.

For better understanding, the deformable element 7 illustrated in FIG. 6 is illustrated once again, in section, in FIG. 7. For orientation, the geometric axis 23, the axial direction 24, the radial direction 25 and the circumferential direction 26 are plotted here too. The figure shows the outer sealing element 27 and the stiffening ring 28 of the deformable element 7, and the centering rings 22, which are arranged on both sides of the stiffening ring 28 in the axial direction 24. The figure indicates in each case the sealing lips 20 of the deformable element and, by dashed lines, the annular contact seals 21 by which the sealing lips 20 bear in fluid-tight fashion against the pump housing 2.

Figure 8:
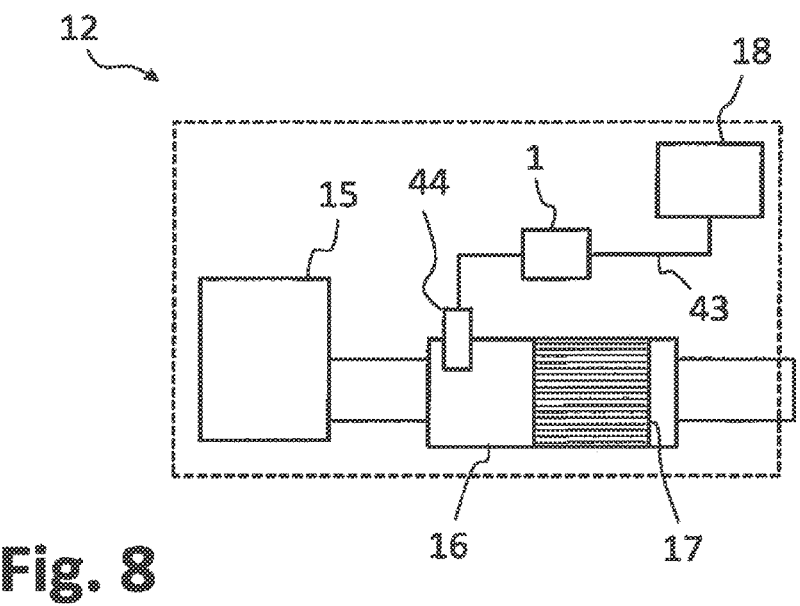
FIG. 8: shows a motor vehicle having a described pump.

FIG. 8 shows a motor vehicle 12 having an internal combustion engine 15 and having an exhaust-gas treatment device 16 for the purification of the exhaust gases of the internal combustion engine 15. In the exhaust-gas treatment device 16 there is arranged an SCR catalytic converter 17 by which the method of selective catalytic reduction can be carried out. For this purpose, liquid additive for exhaust-gas purification is fed to the exhaust-gas treatment device 16 by an injector 44. The liquid additive is delivered from a tank 18 to the injector 44 via a line 43 by a pump 1 as described above.

Owing to the described invention, an orbital pump for providing liquid additive for exhaust-gas purification exhibits particularly low susceptibility to the temperature as a cross-influence on the dosing accuracy.

It is pointed out that the features explained in the individual patent claims may be combined with one another in any desired technologically meaningful way and may be supplemented by explanatory facts from the description, with further design variants of the pump being specified.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMERALS

1 Pump
2 Pump housing
3 Inlet
4 Outlet
5 Eccentric
6 Outer face
7 Deformable element
8 Delivery duct
9 Displaceable seal
10 Pump volume
11 Pump gap
12 Motor vehicle
13 Inner circumferential face
14 Section
15 Internal combustion engine
16 Exhaust-gas treatment device
17 SCR catalytic converter
18 Tank
19 Protuberance
20 Sealing lip
21 Annular contact seal
22 Centring ring
23 Geometric axis
24 Axial direction
25 Radial direction
26 Circumferential direction
27 Sealing element
28 Stiffening ring
29 Compensation element
30 Eccentricity
31 Sealing angle
32 Half sealing angle
33 Sealing position
34 Third diameter 35 Sealing element thickness
36 Compression
37 Minimum compensation element thickness
38 Maximum compensation element thickness
39 Eccentric diameter
40 Element thickness
41 First outer diameter
42 Ring thickness
43 Line
44 Injector
45 Drive shaft
46 Inner eccentric region
47 Eccentric bearing
48 Outer ring
49 Static seal
50 Pin
51 Shaft bearing
52 Second outer diameter
53 Delivery direction
54 Central plane

The invention claimed is:

1. A pump (1) for delivering a liquid, comprising:
a pump housing (2) having at least one inlet (3), at least one outlet (4) and an inner circumferential face (13);
a drive shaft (45) defining a geometric axis (23) and axial direction (24) of the pump (1);
an eccentric (5) arranged within the pump housing (2), the eccentric (5) being movable in eccentric fashion relative to the pump housing (2) about the geometric axis (23), the eccentric (5) having an outer face (6);
a deformable element (7) arranged in a pump gap (11) between the inner circumferential face (13) of the pump housing (2) and the outer face (6) of the eccentric (5); and
a delivery duct (8) extending from the at least one inlet (3) to the at least one outlet (4) by the deformable element (7) and by the inner circumferential face (13) of the pump housing (2),
wherein the deformable element (7) is pressed against the pump housing (2) along at least one section (14) of the delivery duct (8) by the outer face (6) of the eccentric (5) such that at least one displaceable seal (9) of the delivery duct (8) and at least one closed pump volume (10) are formed in the delivery duct (8), the at least one displaceable seal (9) and the closed pump volume (10) being displaceable along the delivery duct (8) from the inlet (3) to the outlet (4) by a movement of the eccentric (5) for the delivery of the liquid, and
wherein the pump (1) has a stiffening ring (28) on the deformable element (7), and wherein a first coefficient of thermal expansion of the stiffening ring (28) is lower than a third coefficient of thermal expansion of the pump housing (2).

2. The pump (1) according to claim 1, wherein the first coefficient of thermal expansion of the stiffening ring (28) is less than 66% of the third coefficient of thermal expansion of the pump housing (2).

3. The pump (1) according to claim 1, wherein the pump housing (2) comprises plastic and the stiffening ring (28) comprises metal.

4. The pump (1) according to claim 1, wherein the stiffening ring (28) is integrated into the deformable element (7), and wherein the deformable element (7) has, on the outside of the stiffening ring (28), an annular flexible sealing element (27), and has, on the inside of the stiffening ring (28), an annular elastic compensation element (29).

5. The pump (1) according to claim 1, wherein the deformable element (7) is a deformable sealing element (27), against the inside of which the stiffening ring (28) bears, and wherein an elastic compensation element (29) is arranged between the stiffening ring (28) and the eccentric (5).

6. The pump (1) according to claim 5, wherein the deformable sealing element (27) has a first modulus of elasticity and the elastic compensation element (29) has a second modulus of elasticity, wherein the second modulus of elasticity is at least twice the first modulus of elasticity.

7. The pump (1) according to claim 1, wherein the stiffening ring (28) has a third modulus of elasticity which is at least twice a second modulus of elasticity of a compensation element (29) arranged between the stiffening ring (28) and the eccentric (5).

8. The pump (1) according to claim 1, wherein the pump (1) is configured such that a compression (36) of the deformable element (7) in a region of the at least one displaceable seal (9) corresponds to at most 5% of an element thickness (40) of the deformable element (7).

9. The pump (1) according to claim 1, wherein the at least one displaceable seal (9) bears against the inner circumferential face (13) of the pump housing (2) over a sealing angle (31) about the geometric axis (23), wherein the sealing angle (31) amounts to at least 90°.

10. The pump (1) according to claim 1, wherein the stiffening ring (28) has a first coefficient of thermal expansion $\lambda_1$ and a first outer diameter $D_1$ (41), the deformable element (7) has a second coefficient of thermal expansion $\lambda_2$ and a second outer diameter $D_2$ (52), and the pump housing (2) has a third diameter $D_3$ (34) and a third coefficient of thermal expansion $\lambda_3$, wherein the first outer diameter $D_1$ (41) of the stiffening ring (28) is configured in accordance with the following formula:

$$D_1 = \frac{D_3 \times \lambda_3 - D_2 \times \lambda_2}{\lambda_1 - \lambda_2}$$

11. The pump (1) according to claim 1, wherein the deformable element (7) is supported, on both sides of the eccentric (5) in the axial direction (24), on the inner circumferential face (13) of the pump housing (2) by a respective centering ring (22), and is pressed against the pump housing (2) such that an annular contact seal (21) is formed in each case.

12. A motor vehicle (12) comprising:
an internal combustion engine (15); and
an exhaust gas treatment device (16) for purification of exhaust gases of the internal combustion engine (15), the exhaust gas treatment device having a selective catalytic reduction (SCR) catalytic converter (17) configured to perform the SCR process,
wherein a liquid for exhaust gas purification is feedable to the SCR catalytic converter (17) by the pump (1) according to claim 1.

* * * * *